US005120366A

United States Patent [19]

Harada et al.

[11] Patent Number: 5,120,366

[45] Date of Patent: Jun. 9, 1992

[54] COMPOSITE FERRITE MATERIAL

[75] Inventors: Shinji Harada, Katano; Tadashi Kawamata, Suita, both of Japan

[73] Assignee: Matsushita Electric Industrial Co., Ltd., Osaka, Japan

[21] Appl. No.: 745,639

[22] Filed: Sep. 9, 1991

Related U.S. Application Data

[62] Division of Ser. No. 457,994, Dec. 28, 1989, abandoned.

[30] Foreign Application Priority Data

| | | | |
|---|---|---|---|
| Dec. 28, 1988 | [JP] | Japan | 63-334403 |
| Mar. 15, 1989 | [JP] | Japan | 1-62435 |
| Mar. 15, 1989 | [JP] | Japan | 1-62436 |
| Mar. 15, 1989 | [JP] | Japan | 1-62483 |

[51] Int. Cl.[5] .......... C04B 14/04

[52] U.S. Cl. .......... 106/486; 501/17; 106/456

[58] Field of Search .......... 501/17, 32; 106/425, 106/456, 484, 485, 489; 252/62.58, 62.59

[56] References Cited

U.S. PATENT DOCUMENTS

| | | | |
|---|---|---|---|
| 4,042,519 | 8/1977 | Weaver | 252/62.59 |

FOREIGN PATENT DOCUMENTS

| | | |
|---|---|---|
| 0105375 | 4/1984 | European Pat. Off. . |
| 58-135133 | 8/1983 | Japan . |
| 58-135606 | 8/1983 | Japan . |
| 58-135609 | 8/1983 | Japan . |
| 58-141511 | 8/1983 | Japan . |
| 58-147008 | 9/1983 | Japan . |

*Primary Examiner*—William R. Dixon, Jr.
*Assistant Examiner*—Chris Gallo
*Attorney, Agent, or Firm*—Panitch, Schwarze, Jacobs & Nadel

[57] ABSTRACT

A composite ferrite material is provided. The composite ferrite material obtained from a mixture of a magnetic ferrite powder with high crystallinity, prepared by firing at a prescribed temperature, and a glass powder, having a softening temperature lower than said firing temperature, by heat treatment of said mixture at a temperature which is higher than, or equal to said softening temperature of said glass powder and lower than, or equal to said firing temperature, to effect the binding of said magnetic ferrite powder by said glass material. The composite ferrite material has excellent magnetic characteristics and can be obtained in a form of the desired dimensions with high accuracy.

14 Claims, 2 Drawing Sheets

COMPOSITE FERRITE MATERIAL

CROSS-REFERENCE TO RELATED APPLICATION

This application is a division of U.S. patent application Ser. No. 07/457,994, filed Dec. 28, 1989 now abandoned.

BACKGROUND OF THE INVENTION

1. Field of the invention:

The present invention relates to a composite ferrite material obtained by consolidating a high-crystallinity magnetic ferrite powder with glass, more particularly to a composite ferrite material which can readily be produced in desired dimensions. The present invention also relates to a method for the preparation of above-mentioned composite ferrite materials.

2. Description of the prior art:

Magnetic ferrite articles are manufactured mainly by the powder metallurgical method. In this method, magnetic ferrite powder is sintered by firing at high temperatures in the following manner.

First, ferric oxide powder, and other metal oxide powders such as nickel oxide, zinc oxide, etc., are mixed in specified proportions in accordance with the characteristics of the desired magnetic article, and subjected to pre-sintering. This pre-sintering results in a certain degree of solid phase reaction at the grain boundaries, and the generation of gas. The material so obtained is then pulverized, and granules of an appropriate size are formed by adding water-soluble resin to consolidate the said powder (this process will hereinafter be referred to as granulation). This granular material is then press-formed and the resulting powder mass is subjected to the final firing in a suitable gaseous atmosphere at a temperature higher than the aforementioned pre-sintering temperature. In this manner, a polycrystalline magnetic ferrite article possessing the desired magnetic properties and mechanical strength is obtained.

FIG. 4 shows the microstructure of such a polycrystalline magnetic ferrite mass obtained by sintering. This sintered magnetic ferrite mass is composed of an aggregate of porous sintered magnetic powder 6 possessing numerous pores 9. Other pores 8 are also present to some extent at the grain boundaries between the grains of said magnetic powder 6.

The temperature at which the pre-sintering is carried out in the aforementioned method is set in the range of 700°-1000° C., wherein a solid phase reaction is initiated at the interfaces of the original raw materials, i.e., ferric oxide, nickel oxide, zinc oxide, etc. The temperature of the final firing, performed in order to attain an adequate degree of sintering, is ordinarily set in the higher range of 1000°-1400° C. The temperature of the final firing that is employed varies according to the composition of raw materials, the condition of pre-sintering, the shapes and grain size of the powder after pre-sintering. The gaseous atmosphere used when firing varies according to the type of magnetic powder product desired, both oxidizing and non-oxidizing atmospheres being employed.

In the aforementioned methods, the powder obtained by pre-sintering is of grain diameter 2-5 $\mu$m or less. In the mass formed by compression of this powder, the granules of the said powder are in mutual contact, but considerable gaps still remain between the granules. When the powder mass formed from this pre-sintered powder is heated at a temperature exceeding the pre-sintering temperature (700°-1000° C.), mutual diffusion of the atoms that constitute the granules occurs at the areas of contact between pre-sintered powder granules, and thus sintering proceeds. As sintering progresses, the gaps between the pre-sintered powder granules decrease. As a result, the final firing causes a further densification of the pre-sintered powder mass, ordinarily by a ratio ranging from 10 to 20% and in some cases even higher, which may cause deterioration in the dimensional precision and yield of the final sintered product. In order to obtain final sintered compacts of the desired dimensions, machine finishing processes such as cutting or grinding are necessary.

In general, in order to form sintered articles of uniform composition that does not crack when subjected to abrupt rises or falls of temperature, comparatively gradual elevation and reduction of temperature during the final firing is essential. Consequently, the final firing process ordinarily requires at least half a day, and in some cases may even last for two days.

Considerable research has already been conducted into efforts to improve these defects in ferrite sintering methods. For example, Japanese Laid-Open Patent Publication Nos. 58-135133 and 58-135606, discloses that when a mixture of pre-sintered ferrite powder and glass powder is press-formed, and the resulting mass is fired at an appropriate temperature sufficiently high as to allow sintering of the said magnetic powder, the said glass powder fuses, the magnetic ferrite powder granules are bound by the glass, and as a result the degree of contraction of the ferrite mass becomes relatively small. However, in the above-mentioned process, because the mass made of the powder mixture is fired at a temperature exceeding the temperature of the pre-sintering that is carried out to obtain the pre-sintered ferrite powder, a contraction of several percent occurs. This is due to the fact that, although most of the ferrite powder grains are separated from each other by the fused glass, a solid phase reaction may occur at the interfaces between the ferrite powder grains during the final firing operation.

In general, if sintering is performed in order to obtain the desired characteristics in the manufacture of sintered ferrite articles, then the further the sintering process progresses, the greater the proportion of shrinkage of the said article. In the aforementioned method, if the content of glass powder, is increased in order to suppress shrinkage, then the essential characteristics of the ferrite cannot be adequately manifested in the final product. Sintered ferrite articles are widely used as materials for electronic parts and devices, and therefore ferrite articles which combine high-level functional characteristics with dimensional precision are important desiderata.

SUMMARY OF THE INVENTION

A composite material of this invention, which overcomes the above-discussed and numerous other disadvantages and deficiencies of the prior art, is obtained from a mixture of a magnetic ferrite powder with high crystallinity, prepared by firing at a prescribed temperature, and a glass powder, having a softening temperature lower than said firing temperature, by heat treatment of said mixture at a temperature which is higher than, or equal to said softening temperature of said glass powder and lower than, or equal to said firing temperature, to effect the binding of said magnetic ferrite powder by said glass material.

A method for the preparation of composite ferrite material of this invention comprises mixing a magnetic ferrite powder with high crystallinity, prepared by firing at a prescribed temperature, and a glass powder with a softening temperature lower than said firing temperature, subjecting said mixture to press-forming, and subjecting said press-formed mass to heat treatment at a temperature which is higher than or equal to the softening temperature of said glass powder and lower than or equal to said firing temperature to fuse said glass powder contained in said mass thereby binding said magnetic ferrite powder with said fused glass.

A method for the preparation of composite ferrite material of this invention comprises mixing a magnetic ferrite powder with high crystallinity, prepared by firing at a prescribed temperature, and a glass powder with a softening temperature lower than said firing temperature, subjecting said mixture to press-forming and simultaneous heat treatment at a temperature which is higher than or equal to the softening temperature of said glass powder, and lower than or equal to, said firing temperature and thereby fusing said glass powder, thus effecting the binding of said magnetic ferrite powder by said fused glass, and firing the obtained mass after said heat treatment at a temperature which is lower than or equal to the firing temperature of said magnetic ferrite powder.

In a preferred embodiment, the magnetic ferrite powder is composed of granules with at least two different size distributions.

In a preferred embodiment, the glass contains zinc oxide.

In a preferred embodiment, the firing temperature is in the range of 1000°-1400° C.

In a preferred embodiment, the temperature of said heat treatment is 800° C. or higher.

In a preferred embodiment, the glass powder is used in an amount of 0.3 to 30% by weight based on the total weight of said glass powder and said magnetic ferrite powder with high crystallinity.

Thus, the invention described herein makes possible the objectives of:

(1) providing a composite ferrite material with excellent magnetic characteristics that can be obtained in a form of the desired dimensions with high accuracy;

(2) providing a composite ferrite material with high electrical resistance, which achieves excellent high frequency characteristics even when magnesium-zinc type ferrite materials with low electrical resistance are used; and (3) providing a method for producing abovementioned excellent composite ferrite material economically in a short period of time.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
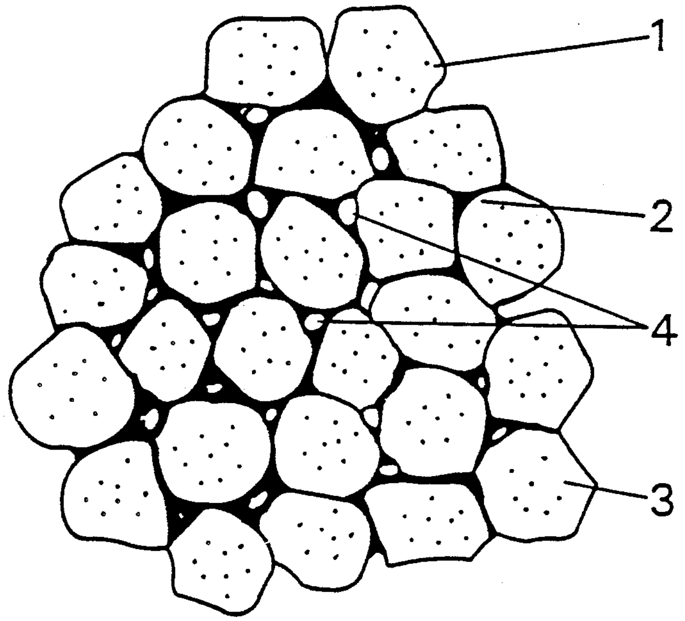
FIGS. 1-3 are enlarged schematic illustrations showing the structure of the composite ferrite material of the present invention.

The magnetic ferrite powder with high crystallinity used in the present invention is prepared by mixing ferric oxide and other metal oxides in the form of MxO (wherein M is a metal of valence n and $\times = 2/n$) such as NiO, ZnO, etc., heating the mixture at a temperature of 1000° C. or more, preferably in the range of 1000°-1400° C., in order to effect adequate ferritization, and then pulverizing this material. This magnetic ferrite powder with high crystallinity is a ferrimagnetic substance possessing the characteristic spinel crystal structure of ferrite materials. If a soft magnetic ferrite material is desired, then, since a low magnetic coercive force Hc is desirable in the aforementioned magnetic ferrite powder, the grain size of the powder should be large. However, if the grain size is unduly large, then the packing density of the powder mass will be low, therefore magnetic ferrite powder with high crystallinity of grain diameter 100-200 μm is ordinarily used. When hard ferrite materials are prepared, high coercive force Hc and large energy products are desirable: in order to achieve this, granules of diameter allowing the formation of particles of single magnetic domain are desirable. When magnetic ferrite powders with high crystallinity having two or more different grain size distributions, the smaller grains can fill the voids in the magnetic mass. Magnetic powders with grain diameters of 5 μm or less are effective for the smaller grains.

The glass composing the glass powder used in the present invention has a softening temperature that is lower than the firing temperature for preparing the aforementioned magnetic ferrite powder with high crystallinity. In order that the composite ferrite material so obtained can be used at comparatively high temperatures, the softening temperature of the glass should desirably be at least 300° C. Moreover, since the firing temperature of the magnetic ferrite powder is 700° C. or higher, and the heat-resistant temperature of metal molds is ordinarily in the order of 700° C., the said softening temperature should desirably be lower than 700° C. More specifically, glass with a softening temperature not exceeding 650° C. is used. Furthermore, this glass should desirably contain zinc oxide in a proportion not exceeding 30% by weight, preferably 1-30% by weight. If zinc oxide in a proportion between 1-30% by weight is contained in the glass, then magnetic ferrite articles with low dielectric losses are obtained.

The grain diameter of this glass powder should desirably be 10 μm or less. The amount of this glass powder should desirably be from 0.3 to 30% by weight, based on the total weight of the aforementioned magnetic ferrite powder and the said glass powder. If the amount of glass powder is less than 0.3% by weight, then the effect of the glass in binding the magnetic powder granules is insufficient, and the magnetic ferrite powder article so obtained will be of low mechanical strength. Conversely, if the amount of glass powder exceeds 30% by weight, then the magnetic properties of the ferrite powder will not be adequately manifested in the product.

FIG. 1 shows an enlarged schematic illustration showing the structure of the composite ferrite material of the first embodiment of the present invention. This composite ferrite material is obtained by binding the magnetic ferrite powder with high crystallinity 1 with the glass material 2, which softens and fuses at a temperature lower than the firing temperature for the ferrite powder. For example, first, the aforementioned magnetic ferrite powder with high crystallinity 1 and the aforementioned glass powder are thoroughly mixed and granulated. This is then subjected to press-forming, and heated at a temperature not exceeding the aforementioned firing temperature but at least as high as the melting temperature of the said glass powder. This heat treatment is performed in order to melt the glass powder and allow the molten glass to permeate the gaps between the magnetic powder granules. The time required for heat treatment that includes the time required for elevation of the temperature to the prescribed value, the period of maintenance of the said temperature and the time required for subsequent temperature reduction, can sufficiently be 3 hours or less.

The softened glass permeates the gaps between the magnetic powder granules and binds the said granules together. As shown in FIG. 1, even after heat treatment, voids 4 still exist within the solidified glass. The void ratio is almost the same as before heating, and consequently the degree of shrinkage is extremely low. If the temperature of heat treatment is at least 800° C., then the binding effect of the glass is increased, and a composite ferrite material with excellent magnetic properties is obtained.

Figure 2:
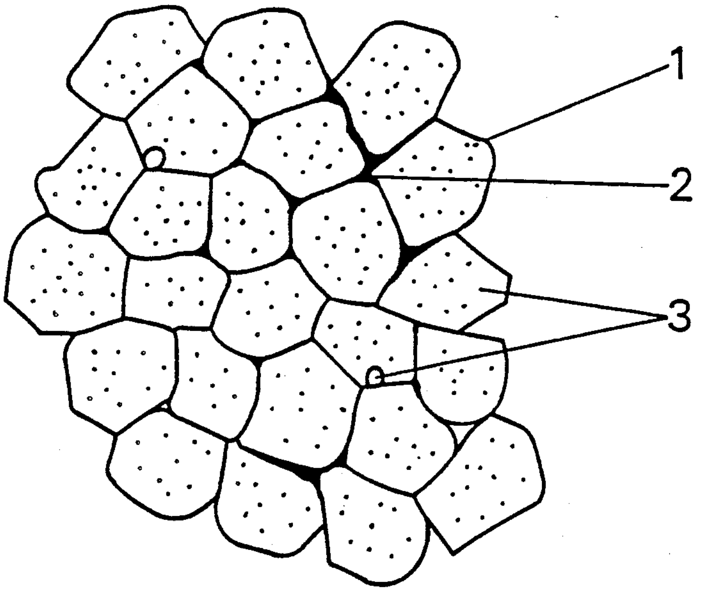

FIG. 2 shows an enlarged schematic illustration showing the structure of the composite ferrite material of the second embodiment of the present invention. This composite ferrite material is obtained by applying pressure to bind the magnetic ferrite powder with high crystallinity 1 with the glass material 2, which softens and fuses at a temperature lower than the firing temperature for obtaining the ferrite powder. More specifically, first, the magnetic ferrite powder with high crystallinity 1 and the aforementioned glass material are thoroughly mixed and granulated. Then, during press forming, this material is heated at a temperature which is higher than or equal to the softening temperature of the glass powder, and lower than or equal to the aforementioned firing temperature, thereby softening and fusing the glass powder. The temperature used for this heat treatment is relatively low but sufficient to ensure the fusion of the glass powder and the ready permeation of the fused glass into the gaps between the magnetic powder granules. For example, a temperature that is higher than the softening temperature of the glass powder by 20°-30° C. is employed. Since the molten glass permeates the gaps between the magnetic powder granules and pressure is applied simultaneously, the voids between the magnetic powder granules are almost completely eliminated, and a high density compact with sporadic pores 3 is formed. The high density mass formed in this manner by binding the magnetic powder granules with glass are then heat-treated at a temperature lower than the firing temperature used when preparing the aforementioned magnetic powder with high crystallinity. The temperature used for this heat treatment is comparatively high, for example, a temperature that is lower than the firing temperature for preparing the magnetic ferrite powder with high crystallinity by 50°-100° C. is employed.

Figure 3:
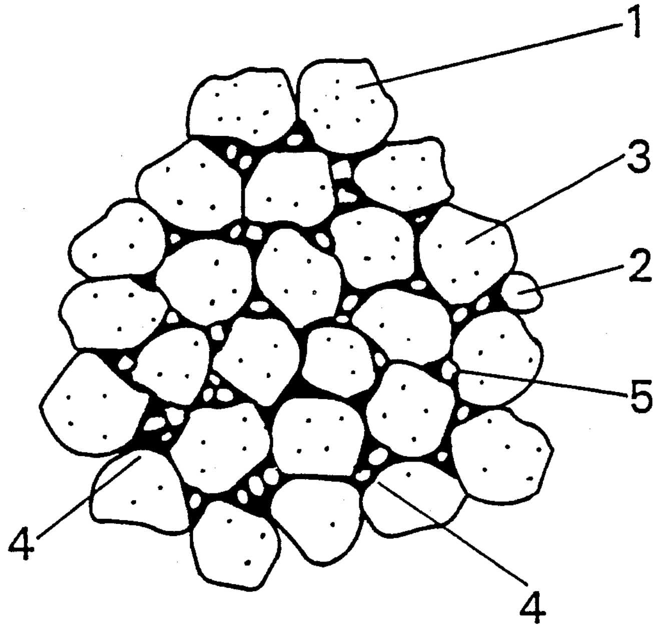
Figure 4:
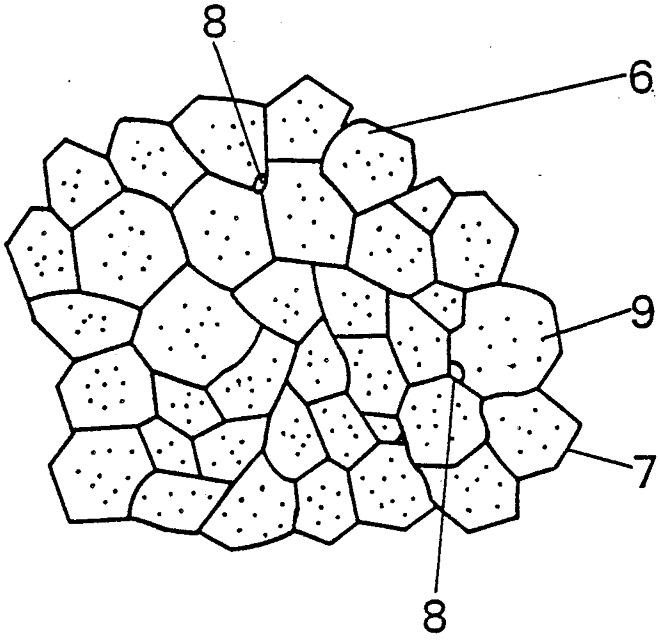
FIG. 4 is an enlarged schematic illustration showing the structure of a conventional sintered ferrite mass.

FIG. 3 shows an enlarged schematic illustration showing the structure of the composite ferrite material of the third embodiment of the present invention. This embodiment is almost identical with the first embodiment, however, in the present case, at least two varieties of magnetic ferrite powder with high crystallinity having different grain size distributions are used. The grain size of the magnetic powder with the smaller granules should desirably be 5 μm or less, this magnetic powder being used to increase the packing density of the mass. This composite ferrite material can be obtained, for example, by the following procedure. First, the aforementioned two or more varieties of magnetic ferrite powder with high crystallinity, in the present case 1 and 5, are thoroughly mixed and granulated. This is then subjected to press-forming, and heated at a temperature that is higher than or equal to the softening temperature of the glass powder and lower than or equal to the firing temperature for preparing the magnetic ferrite powder with high crystallinity, thereby softening and fusing the aforementioned glass powder. The heating temperature and time in the present case are the same as in the aforementioned first embodiment. The softened glass permeates the gaps between the magnetic powder granules and binds the said granules together. In the first embodiment, as shown in FIG. 1, voids 4 are present within the solidified glass. However, in the present embodiment, the larger voids between the magnetic powder granules are filled with the granules of the smaller grain-sized magnetic powder, thereby obtaining a mass of higher density than the type produced in the first embodiment.

Magnetic ferrite powders with high crystallinity which are sufficiently ferritized by firing are used in the above-mentioned methods of first to third embodiments of the present invention. Therefore, when a powder mass made of the said magnetic ferrite powder and glass powder is subjected to heat treatment at a temperature which is higher than or equal to the softening temperature of the glass powder and lower than or equal to the firing temperature, no further solid phase reaction occurs between the magnetic ferrite powder granules, and consequently the volume of the final mass is almost undiminished. Moreover, since the magnetic powder granules are bound together by the fused glass, masses of high strength are obtained. The aforementioned heating temperature is lower than the firing temperature used for conventional types of ferrite articles, and moreover, this heating is completed in a short time, hence, the production cost is low. Thus, ferrite articles of high dimensional precision can be easily and economically produced. Furthermore, since the ferrite articles contain glass, high electrical resistance can be obtained even when magnesium-zinc type ferrite materials with low resistivity are used. Therefore, excellent high frequency characteristics are obtained even for the soft type of ferrite articles which are necessary to reduce eddy current losses. The composite ferrite materials of the present invention are therefore suitable for wide applications in various electronic parts and other industrial uses.

The present invention will be described in greater detail with reference to the following examples.

EXAMPLES 1-7

A mixed powder composed of ferric oxide powder, nickel oxide powder and zinc oxide powder mixed in the molar ratio of 50:18:32 was fired at 1320° C. for 6 hours, and this mixture was then pulverized, obtaining a nickel-zinc soft-type magnetic ferrite powder with high crystallinity, the ferrite powder particles having a mean grain diameter of 70 μm. An X-ray analysis of this powder revealed the sharp spinel diffraction lines characteristic of soft ferrite, and demonstrated that this was a magnetic powder with extremely high crystallinity.

To this magnetic ferrite powder, alkali-free lead borosilicate glass powder with mean grain diameter of 1 μm and softening point (Td) of 370° C. was then added in an amount shown in Table 1 (the value in Table 1 shows % by weight of the glass powder based on the total weight of the magnetic ferrite powder and the glass powder), and the powder was mixed and granulated. The mixed powder was then formed under a pressure of 3 ton/$cm^2$, thereby preparing an annular mass with inner diameter 7 mm, outer diameter 12 mm and thickness 3 mm.

The mass was then placed in an electric furnace and heat treated in air at 1200° C. for 60 minutes, thereby obtaining glass-bonded annular ferrite core.

The value of the initial magnetic permeability, saturation magnetic flux density, percentage of shrinkage and tensile strength of the core were measured by the following methods. The results of this measurements are shown in Table 1.

Initial permeability was measured in accordance with JIS C2561 by the following procedure. First, a layer of insulating tape was formed by winding the tape onto the ferrite core, after which a layer of insulated copper wire 0.26 mm in diameter was formed by winding the wire around the entire circumference of the core. Next, the self-inductance of this specimen was measured with a Maxwell bridge at a magnetic field strength not exceeding 0.3 Å/m, and the initial magnetic permeability at a frequency of 1 MHz was calculated from the results of this measurement.

COMPARATIVE EXAMPLE 1

The same procedure was repeated as in Example 1, except that glass powder was not used. The physical properties of the annular ferrite core so obtained are shown in Table 1, along with the corresponding results for the Comparative Examples 2 and 3 to be described below.

COMPARATIVE EXAMPLE 2

A mixed granulated powder with the same composition as that used in Comparative Example 1 was fired at 1000° C. for 2 hours followed by pulverization to a grain diameter of 2-5 μm. This powder was granulated, and using this material, an annular powder mass was prepared in the same manner as in Example 1.

This mass was placed in an electric furnace, fired in air at 1300° C. for 3 hours and then slowly cooled, thus obtaining an annular nickel-zinc sintered ferrite core.

COMPARATIVE EXAMPLE 3

The same type of glass powder as used in Example 1 was added in a proportion of 5% by weight to the same type of pre-sintered powder as used in Comparative Example 2. After mixing and granulation, an annular mass was prepared from this material by the same procedure as used in Example 1. The mass obtained was then placed in an electric furnace and heat-treated in air at 1200° C. for 60 minutes, thus obtaining an annular ferrite core. Table 1.

TABLE 1

| | Amount of glass (wt %) | Firing temperature and time for preparing magnetic ferrite powder (°C./hours) | Temperature and time for heat treatment (°C./hours) | Density (g/$cm^3$) | Initial magnetic permeability at 1 MHz | Saturation magnetic flux density at 10 Oe | Shrinkage (%) | Tensile strength (kg/$m^2$) |
|---|---|---|---|---|---|---|---|---|
| Example 1 | 0.5 | 1320/6 | 1200/1 | 3.8 | 200 | 3100 | 0 | 4 |
| Example 2 | 1 | 1320/6 | 1200/1 | 3.8 | 220 | 3140 | 0 | 5 |
| Example 3 | 3 | 1320/6 | 1200/1 | 3.9 | 280 | 3200 | 0 | 7 |
| Example 4 | 5 | 1320/6 | 1200/1 | 3.9 | 270 | 3180 | 0.1 | 9 |
| Example 5 | 10 | 1320/6 | 1200/1 | 4.0 | 260 | 3160 | 0.7 | 15 |
| Example 6 | 30 | 1320/6 | 1200/1 | 4.1 | 180 | 3080 | 7.1 | 17 |
| Example 7 | 40 | 1320/6 | 1200/1 | 4.2 | 150 | 3040 | 12.5 | 18 |
| Comparative Example 1 | 0 | 1320/6 | 1200/1 | 3.8 | 120 | 3040 | 0 | 2 |
| Comparative Example 2 | 0 | 1000/2 | 1300/3 | 4.9 | 830 | 3900 | 18.7 | 18 |
| Comparative Example 3 | 5 | 1000/2 | 1200/1 | 4.3 | 640 | 3800 | 19.0 | 20 or more |

Saturation magnetic flux density was measured in accordance with JIS C2561 in a 10 Oe magnetic field, using a self-recording flux meter.

The percentage of shrinkage was calculated from measurements of the outer diameter of the annular mass prior to heat treatment and the ferrite core obtained after the heat treatment.

Tensile strength was measured in accordance with JIS C2564 as follows. First, two fine wires were passed through the annular ferrite core, the two ends of one of these wires were fixed at a single point, the two ends of the other wire were placed together and subjected to traction at a velocity not exceeding 5 mm/min, and the strength was determined from the tensile load at the instant when the specimen broke.

EXAMPLES 8-12

The same procedure was repeated as in Example 4, except that the temperature for heat treatment of the mass was varied as shown in Table 2. The physical properties of the annular ferrite core so obtained are shown in Table 2, along with the corresponding results for the Example 13 described below.

EXAMPLE 13

The same procedure was repeated as in Example 4, except that alkali-free lead borosilicate glass powder with softening temperature (Td) of 700° C. was used in place of the previously mentioned alkali-free lead borosilicate glass powder with softening point of 370° C.

TABLE 2

| | Amount of glass (wt %) | Firing temperature and time for preparing magnetic ferrite powder (°C./hours) | Temperature and time for heat treatment (°C./hours) | Density (g/cm³) | Initial magnetic permeability at 1 MHz | Saturation magnetic flux density at 10 Oe | Shrinkage (%) | Tensile strength (kg/m²) |
|---|---|---|---|---|---|---|---|---|
| Example 8 | 5 | 1320/6 | 1300/1 | 3.9 | 460 | 3200 | 3.0 | 10 |
| Example 9 | 5 | 1320/6 | 1000/1 | 3.9 | 120 | 3020 | 0 | 8 |
| Example 10 | 5 | 1320/6 | 800/1 | 3.9 | 70 | 2980 | 0* | 7 |
| Example 11 | 5 | 1320/6 | 600/1 | 3.9 | 30 | 2850 | 0 | 5 |
| Example 12 | 5 | 1320/6 | 450/1 | 3.9 | 25 | 2800 | 0 | 4 |
| Example 13 | 5 | 1320/6 | 1200/1 | 3.9 | 200 | 3100 | 0.5 | 8 |

EXAMPLE 14

A mixed powder composed of barium oxide powder and ferric oxide powder mixed in a molar ratio of 1:6 was fired at 1300° C. for 2 hours, after which the mixture was pulverized, thus obtaining a hard-type magnetic barium ferrite powder with high crystallinity, the ferrite powder particles having a mean grain diameter of 1 μm.

To this magnetic barium ferrite powder, 5% by weight of alkali-free lead borosilicate glass powder with mean grain diameter of 1 μm and softening point of 370° C. was added. After mixing and granulation, this material was press-formed under a pressure of 3 ton/cm², thereby preparing an annular mass with an inner diameter 7 mm, an outer diameter 12 mm and a thickness 3 mm.

The mass was then placed in an electric furnace and heat-treated in air at 1200° C. for 30 minutes, thus obtaining an annular glass-bonded ferrite core. The dimensions of this core was almost identical with those of the original powder mass. The physical properties of the barium ferrite core obtained in this manner are shown in Table 3, along with the corresponding results for the Comparative Example 4 described below.

COMPARATIVE EXAMPLE 4

A mixed powder with the same composition as used in Example 14 was pre-sintered at 1000° C. for 1 hour. After pulverization to a grain diameter of 0.5 μm and granulation, an annular powder mass was prepared from this material in the same manner as in Example 14.

The mass so obtained was placed in an electric furnace, fired in air at 1250° C. for 3 hours and then slowly cooled, thus obtaining an annular sintered barium ferrite core.

TABLE 3

| | Density (g/cm³) | Maximum energy product $(BH)_{max}$MGOe | Shrinkage (%) | Tensile strength (kg/m²) |
|---|---|---|---|---|
| Example 14 | 4.2 | 2.0 | 1.5 | 10 |
| Comparative Example 4 | 4.8 | 2.4 | 10.5 | 20 |

EXAMPLES 15–21

A mixed powder composed of ferric oxide powder, nickel oxide powder and zinc oxide powder mixed in a molar ratio of 50:18:32 was fired at 1320° C. for 6 hours, after which the mixture was pulverized, thus obtaining a soft-type nickel-zinc magnetic ferrite powder with high crystallinity, the ferrite powder particles having a mean grain diameter of 50–100 μm.

To this magnetic ferrite powder, alkali-free lead borosilicate glass powder with mean grain diameter of 1 μm and softening point (Td) of 370° C. was added in an amount as shown in Table 4. After mixing and granulation, a specified amount of this mixed powder was packed into a stellite mold and hot pressed for 2 minutes at 420° C. in air under a pressure of 3 ton/cm², thereby preparing an annular mass with an inner diameter of 7 mm, an outer diameter 12 mm and a thickness 3 mm.

The mass so obtained was then placed in an electric furnace and heat-treated in air at 1200° C. for 60 minutes, thus obtaining an annular glass-bonded ferrite core.

The properties of the ferrite core are shown in Table 4, along with the corresponding results for Example 22 and the Comparative Example 5 described below.

COMPARATIVE EXAMPLE 5

The same procedure was repeated as in Example 15, except that glass powder was not used and heat was not applied when the annular mass was formed.

EXAMPLE 22

The same procedure was repeated as in Example 18, except that alkali-free lead borosilicate glass powder with softening temperature (Td) of 700° C. was used in place of the previously mentioned alkali-free lead borosilicate glass powder with softening temperature of 370° C., and that the heating temperature used when the annular mass was formed was 700° C. in the present case. When the heating temperature was set at 800° C., the core so formed could not be removed from the stellite mold due to the deformation of the mold.

TABLE 4

| | Amount of glass (wt %) | Heating conditions | Firing temperature and time for preparing magnetic ferrite powder (°C./hours) | Temperature and time for heat treatment (°C./hours) | Density (g/cm³) | Initial magnetic permeability at 1 MHz | Saturation magnetic flux density at 10 Oe | Shrinkage (%) | Tensile strength (kg/m²) |
|---|---|---|---|---|---|---|---|---|---|
| Example 15 | 0.5 | A | 1320/6 | 1200/1 | 4.0 | 260 | 3100 | 0.1 | 9 |
| Example 16 | 11 | A | 1320/6 | 1200/1 | 4.0 | 360 | 3150 | 0.2 | 12 |
| Example 17 | 3 | A | 1320/6 | 1200/1 | 4.1 | 390 | 3200 | 0.2 | 16 |
| Example 18 | 5 | A | 1320/6 | 1200/1 | 4.2 | 380 | 3190 | 0.2 | 20 |

TABLE 4-continued

| | Amount of glass (wt %) | Heating conditions | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 19 | 10 | A | 1320/6 | 1200/1 | 4.2 | 330 | 3170 | 0.7 | 20 or more |
| Example 20 | 30 | A | 1320/6 | 1200/1 | 4.2 | 220 | 3070 | 5.0 | 20 or more |
| Example 21 | 40 | A | 1320/6 | 1200/1 | 4.2 | 180 | 3040 | 11.5 | 20 or more |
| Example 22 | 5 | A | 1320/6 | 1200/1 | 4.1 | 370 | 3180 | 0.2 | 20 |
| Comparative Example 5 | 0 | B | 1320/6 | 1200/1 | 3.8 | 120 | 3040 | 0 | 2 |

A: Hot-pressed in air at 420° C. for 2 minutes under a pressure of 3 ton/cm$^2$, and fired in air.
B: Pressed at room temperature under a pressure of 3 ton/cm$^2$, and fired in air.

EXAMPLES 23–27

The same procedure was repeated as in Example 18, except that the temperature used in the heat treatment of the mass was varied as shown in Table 5. The physical properties of the annular ferrite core obtained in this manner are shown in Table 5.

TABLE 5

| | Amount of glass (wt %) | Heating conditions | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 23 | 5 | A | 1320/6 | 1300/1 | 4.2 | 490 | 3210 | 4.5 | 20 or more |
| Example 24 | 5 | A | 1320/6 | 1000/1 | 4.2 | 150 | 3040 | 0 | 13 |
| Example 25 | 5 | A | 1320/6 | 800/1 | 4.1 | 100 | 2980 | 0 | 9 |
| Example 26 | 5 | A | 1320/6 | 600/1 | 4.1 | 50 | 2850 | 0 | 6 |
| Example 27 | 5 | A | 1320/6 | 450/1 | 4.1 | 30 | 2800 | 0 | 5 |

A: Hot-pressed in air at 420° C. for 2 minutes under a pressure of 3 ton/cm$^2$, and filled in air.

EXAMPLES 28–36

Using a mixed powder composed of ferric oxide powder, nickel oxide powder, zinc oxide powder and cupric oxide powder mixed in a molar ratio of 48:13:34:5, a soft-type magnetic nickel-zinc-copper ferrite powder with high crystallinity, the ferrite powder particles having a mean grain diameter of 70 μm was prepared by the same procedure as in Example 15. The same type of glass powder as was used in Example 15 was then added to this magnetic powder in an amount shown in Table 6, and an annular glass-bonded ferrite core was obtained in the same manner as in Example 15. The properties of the ferrite core are shown in Table 6, along with the corresponding results for the Comparative Examples 6 and 7 described below.

COMPARATIVE EXAMPLE 6

The same procedure was repeated as in Example 28, except that glass powder was not added.

COMPARATIVE EXAMPLE 7

The same procedure was repeated as in Example 33, except that heat was not applied when the annular mass was prepared.

TABLE 6

| | Amount of glass (wt %) | Heating conditions | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 28 | 0.1 | A | 1320/6 | 1200/1 | 3.9 | 250 | 2560 | 0.1 | 6 |
| Example 29 | 0.3 | A | 1320/6 | 1200/1 | 4.0 | 360 | 2580 | 0.1 | 11 |
| Example 30 | 0.5 | A | 1320/6 | 1200/1 | 4.1 | 270 | 2590 | 0.2 | 15 |
| Example 31 | 1 | A | 1320/6 | 1200/1 | 4.1 | 350 | 2630 | 0.2 | 18 |
| Example 32 | 3 | A | 1320/6 | 1200/1 | 4.2 | 280 | 2600 | 0.2 | 19 |
| Example 33 | 5 | A | 1320/6 | 1200/1 | 4.2 | 270 | 2590 | 0.2 | 20 |
| Example 34 | 10 | A | 1320/6 | 1200/1 | 4.2 | 230 | 2540 | 0.4 | 20 or more |
| Example 35 | 30 | A | 1320/6 | 1200/1 | 4.2 | 220 | 2520 | 1.5 | 20 or more |
| Example 36 | 40 | A | 1320/6 | 1200/1 | 4.2 | 160 | 2490 | 4.5 | 20 or more |
| Comparative Example 6 | 0 | B | 1320/6 | 1200/1 | 3.8 | 200 | 2500 | 0 | 3 |
| Comparative Example 7 | 5 | B | 1320/6 | 1200/1 | 4.0 | 260 | 2530 | 0.1 | 12 |

A: Hot-pressed in air at 420° C. for 2 minutes under a pressure of 3 ton/cm$^2$, and fired in air.
B: Pressed at room temperature under a pressure of 3 ton/cm$^2$, and fired in air.

EXAMPLE 7

A mixed powder composed of barium oxide powder and ferric oxide powder mixed in a molar ratio of 1:6 was fired at 1300° C. for 2 hours, after which the mixture was pulverized, thus obtaining a hard-type magnetic barium ferrite powder with high crystallinity, the ferrite powder particles having a mean grain diameter of 1 μm.

Then, using this magnetic barium ferrite powder, annular powder mass was prepared in the same manner as in Example 15. Next, the mass was placed in an electric furnace and heat-treated in air at 1200° C. for 30 minutes, thus obtaining annular glass-bonded ferrite core. The dimensions of the core was almost identical to those of the original powder mass. The physical properties of the ferrite core obtained in this manner are shown in Table 7.

TABLE 7

| | Density (g/cm$^3$) | Maximum energy product $(BH)_{max}$MGOe | Shrinkage (%) | Tensile Strength (kg/m$^2$) |
|---|---|---|---|---|
| Example 37 | 4.3 | 2.1 | 1.0 | 15 |

EXAMPLES 38–44

A mixed powder composed of ferric oxide powder, nickel oxide powder and zinc oxide powder mixed in a molar ratio of 50:18:32 was fired at 1320° C. for 6 hours, after which the mixture was pulverized, thereby obtaining two varieties of soft-type magnetic nickel-zinc ferrite powder with high crystallinity, i. e., (1) a coarse powder with grain diameters ranging from 50 to 100 μm, and (2) a fine powder with a grain diameter of 5 μm or less.

Then, 100 parts by weight of the coarse powder 1 and 30 parts by weight of the fine powder 2 are mixed. Next, alkali-free lead borosilicate glass powder with a mean grain diameter of 1 μm and softening point (Td) of 370° C. was added to the mixture in the proportion shown in Table B based on the total weight of the two varieties of magnetic ferrite powders and glass powder. After mixing and granulation, this material was press-formed under a pressure of 3 ton/cm$^2$, thereby obtaining an annular mass with an inner diameter 7 mm, an outer diameter 12 mm and a thickness 3 mm.

The mass was then placed in an electric furnace and heat-treated in air at 1200° C. for 60 minutes, thus obtaining an annular glass-bonded ferrite core.

The properties of the ferrite core are shown in Table 8, along with the corresponding results for the Comparative Example 8 and Examples 45 and 46 described below.

COMPARATIVE EXAMPLE 8

The same procedure was repeated as in Example 38, except that glass powder was not added.

EXAMPLE 45

The same procedure was repeated as in Example 41, except that the fine magnetic ferrite powder used in the present case had a grain diameter distribution of 5–20 μm.

EXAMPLE 46

The same procedure was repeated as in Example 41, except that the fine magnetic ferrite powder used in the present case had a grain diameter distribution of 20–50 μm.

TABLE 8

| | Amount of glass (wt %) | Grain sizes and mixing ratio of magnetic ferrite powders (parts by weight) | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 38 | 0.5 | Coarse powder[a] 100<br>Fine powder I[b] 30 | 1320/6 | 1200/1 | 4.0 | 250 | 3090 | 0.2 | 5 |
| Example 39 | 1 | Coarse powder[a] 100<br>Fine powder I[b] 30 | 1320/6 | 1200/1 | 4.0 | 250 | 3140 | 0.2 | 10 |
| Example 40 | 3 | Coarse powder[a] 100<br>Fine powder I[b] 30 | 1320/6 | 1200/1 | 4.1 | 380 | 3190 | 0.2 | 14 |
| Example 41 | 5 | Coarse powder[a] 100<br>Fine powder I[b] 30 | 1320/6 | 1200/1 | 4.1 | 370 | 3180 | 0.3 | 18 |
| Example 42 | 10 | Coarse powder[a] 100<br>Fine powder I[b] 30 | 1320/6 | 1200/1 | 4.2 | 320 | 3160 | 1.0 | 20 or more |
| Example 43 | 30 | Coarse powder[a] 100<br>Fine powder I[b] 30 | 1320/6 | 1200/1 | 4.2 | 220 | 3070 | 7.5 | 20 or more |
| Example 44 | 40 | Coarse powder[a] 100<br>Fine powder I[b] 30 | 1320/6 | 1200/1 | 4.2 | 180 | 3040 | 14.5 | 20 or more |
| Comparative Example 8 | 0 | Coarse powder[a] 100<br>Fine powder I[b] 30 | 1320/6 | 1200/1 | 4.0 | 150 | 3040 | 0.2 | 4 |
| Example 45 | 5 | Coarse powder[a] 100<br>Fine powder II[c] 30 | 1320/6 | 1200/1 | 3.9 | 290 | 3170 | 0.1 | 18 |
| Example 46 | 5 | Coarse powder[a] 100<br>Fine powder III[d] 30 | 1320/6 | 1200/1 | 3.9 | 280 | 3160 | 0.1 | 18 |

[a]Grain diameter: 50–100 μm
[b]Grain diameter: 5 μm or less
[c]Grain diameter: 5–20 μm
[d]Grain diameter: 20–50 μm

EXAMPLES 47–51

The same procedure was repeated as in Example 41, except that the temperatures used for heat treatment of the powder mass was varied as shown in Table 9. The physical properties of the annular ferrite core so obtained are shown in Table 9, along with the corresponding results for the Example 52 as described below.

EXAMPLE 52

The same procedure was repeated as in Example 41, except that alkali-free lead borosilicate glass powder with a softening point (Td) of 700° C. was used in place of the previously mentioned alkali-free lead borosilicate glass powder with a softening point of 370° C. and that the heating temperature used in the formation of the annular mass was 700° C. When the heating temperature was raised to 800° C., the stellite mold was deformed and the core could not be removed from the mold.

TABLE 9

| | Amount of glass (wt %) | Grain sizes and mixing ratio of magnetic ferrite powders (parts by weight) | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 47 | 5 | Coarse powder[a] 100 Fine powder I[b] 30 | 1320/6 | 1300/1 | 4.2 | 480 | 3200 | 5.0 | 20 or more |
| Example 48 | 5 | Coarse powder[a] 100 Fine powder I[b] 30 | 1320/6 | 1000/1 | 4.1 | 140 | 3030 | 0 | 12 |
| Example 49 | 5 | Coarse powder[a] 100 Fine powder I[b] 30 | 1320/6 | 800/1 | 4.1 | 90 | 2980 | 0 | 8 |
| Example 50 | 5 | Coarse powder[a] 100 Fine powder I[b] 30 | 1320/6 | 600/1 | 4.1 | 40 | 2840 | 0 | 6 |
| Example 51 | 5 | Coarse powder[a] 100 Fine powder I[b] 30 | 1320/6 | 450/1 | 4.1 | 30 | 2800 | 0 | 5 |
| Example 52 | 5 | Coarse powder[a] 100 Fine powder I[b] 30 | 1320/6 | 1200/1 | 4.1 | 330 | 3090 | 1.0 | 10 |

[a]Grain diameter: 50-100 μm
[b]Grain diameter: 5 μm or less

EXAMPLES 53-61

The same procedure was repeated as in Example 38, except that a mixed powder composed of ferric oxide powder, nickel oxide powder, zinc oxide powder and cupric oxide powder mixed in a molar ratio of 48:13:34:5 was used, and the glass powder was added in the proportion shown in Table 10. The properties of the ferrite core so obtained are shown in Table 10, along with the corresponding results for the Comparative Example 9 described below.

COMPARATIVE EXAMPLE 9

The same procedure was repeated as in Example 53, except that glass powder was not added.

TABLE 10

| | Amount of glass (wt %) | Grain sizes and mixing ratio of magnetic ferrite powders (parts by weight) | Firing temperature and time for preparing magnetic ferrite powder (°C./hours) | Temperature and time for heat treatment (°C./hours) | Density (g/cm$^3$) | Initial magnetic permeability at 1 MHz | Saturation magnetic flux density at 10 Oe | Shrinkage (%) | Tensile strength (kg/m$^2$) |
|---|---|---|---|---|---|---|---|---|---|
| Example 53 | 0.1 | Coarse powder[a] 100 Fine powder I[b] 30 | 1320/6 | 1200/1 | 3.9 | 250 | 2560 | 0.2 | 5 |
| Example 54 | 0.3 | Coarse powder[a] 100 Fine powder I[b] 30 | 1320/6 | 1200/1 | 4.0 | 260 | 2580 | 0.2 | 10 |
| Example 55 | 0.5 | Coarse powder[a] 100 Fine powder I[b] 30 | 1320/6 | 1200/1 | 4.1 | 270 | 2590 | 0.2 | 14 |
| Example 56 | 1 | Coarse powder[a] 100 Fine powder I[b] 30 | 1320/6 | 1200/1 | 4.1 | 350 | 2630 | 0.2 | 18 |
| Example 57 | 3 | Coarse powder[a] 100 Fine powder I[b] 30 | 1320/6 | 1200/1 | 4.2 | 280 | 2600 | 0.3 | 19 |
| Example 58 | 5 | Coarse powder[a] 100 Fine powder I[b] 30 | 1320/6 | 1200/1 | 4.2 | 270 | 2590 | 0.5 | 20 or more |
| Example 59 | 10 | Coarse powder[a] 100 Fine powder I[b] 30 | 1320/6 | 1200/1 | 4.2 | 230 | 2540 | 1.5 | 20 or more |
| Example 60 | 30 | Coarse powder[a] 100 Fine powder I[b] 30 | 1320/6 | 1200/1 | 4.2 | 220 | 2520 | 3.0 | 20 or more |
| Example 61 | 40 | Coarse powder[a] 100 Fine powder I[b] 30 | 1320/6 | 1200/1 | 4.2 | 160 | 2490 | 5.5 | 20 or more |
| Comparative Example 9 | 0 | Coarse powder[a] 100 Fine powder I[b] 30 | 1320/6 | 1200/1 | 3.9 | 210 | 2520 | 0.1 | 4 |

[a]Grain diameter: 50-100 μm
[b]Grain diameter: 5 μm or less

EXAMPLES 62-68

A mixed powder composed of ferric oxide powder, nickel oxide powder and zinc oxide powder mixed in the molar ratio of 50:18:32 was fired at 1320° C. for 6 hours, and this mixture was then pulverized, obtaining a nickel-zinc soft-type magnetic ferrite powder with high crystallinity, the ferrite powder particles having mean grain diameter of 70 μm. An X-ray analysis of this powder revealed the sharp spinel diffraction lines characteristic of soft ferrite, and it was demonstrated that this was a magnetic powder with extremely high crystallinity.

To this magnetic ferrite powder, 5% by weight of lead borosilicate glass powder with a mean grain diameter of 1 μm and containing zinc oxide in the proportion indicated in Table 11 was added, mixed and granulated. The mixed powder was then formed under a pressure of 3 ton/cm$^2$, thereby preparing an annular mass with an inner diameter 7 mm, an outer diameter 12 mm and a thickness 3 mm.

The mass was then placed in an electric furnace and heat treated in air at 1200° C. for 60 minutes, thereby obtaining a glass-bonded annular ferrite core.

The characteristics of the ferrite core are shown in Table 11.

TABLE 11

| | Amount of glass (wt %) | Amount of ZnO in glass (wt %) | Firing temperature and time for preparing magnetic ferrite powder (°C./hours) | Temperature and time for heat treatment (°C./hours) | Density (g/cm$^3$) | Initial magnetic permeability at 1 MHz | Dielectric loss ($Q_{max}$) | Saturation magnetic flux density at 10 Oe | Shrinkage (%) | Tensile strength (kg/m$^2$) |
|---|---|---|---|---|---|---|---|---|---|---|
| Example 62 | 5 | 0 | 1320/6 | 1200/1 | 3.9 | 260 | 40 | 3160 | 0.1 | 10 |
| Example 63 | 5 | 0.5 | 1320/6 | 1200/1 | 3.9 | 260 | 40 | 3160 | 0.1 | 10 |
| Example 64 | 5 | 1 | 1320/6 | 1200/1 | 3.9 | 260 | 70 | 3170 | 0.1 | 10 |
| Example 65 | 5 | 5 | 1320/6 | 1200/1 | 3.9 | 270 | 80 | 3180 | 0.1 | 11 |
| Example 66 | 5 | 10 | 1320/6 | 1200/1 | 3.9 | 280 | 100 | 3190 | 0.2 | 12 |
| Example 67 | 5 | 30 | 1320/6 | 1200/1 | 3.9 | 260 | 70 | 3170 | 0.1 | 10 |
| Example 68 | 5 | 40 | 1320/6 | 1200/1 | 3.9 | 220 | 50 | 3140 | 0.1 | 10 |

EXAMPLES 69-75

The same procedure was repeated as in Example 66, except that glass powder was added in an amount shown in Table 12.

The properties of the ferrite core so obtained are shown in Table 12, along with the corresponding results for the Comparative Example 10 described below.

COMPARATIVE EXAMPLE 10

The same procedure was repeated as in Example 66, except that glass powder was not added.

TABLE 12

| | Amount of glass (wt %) | Amount of ZnO in glass (wt %) | Firing temperature and time for preparing magnetic ferrite powder (°C./hours) | Temperature and time for heat treatment (°C./hours) | Density (g/cm$^3$) | Initial magnetic permeability at 1 MHz | Dielectric loss ($Q_{max}$) | Saturation magnetic flux density at 10 Oe | Shrinkage (%) | Tensile strength (kg/m$^2$) |
|---|---|---|---|---|---|---|---|---|---|---|
| Example 69 | 0.5 | 10 | 1320/6 | 1200/1 | 3.8 | 200 | 40 | 3100 | 0 | 3 |
| Example 70 | 1 | 10 | 1320/6 | 1200/1 | 3.8 | 210 | 70 | 3120 | 0 | 7 |
| Example 71 | 3 | 10 | 1320/6 | 1200/1 | 3.9 | 270 | 80 | 3180 | 0 | 8 |
| Example 72 | 5 | 10 | 1320/6 | 1200/1 | 3.9 | 260 | 100 | 3160 | 0.1 | 10 |
| Example 73 | 10 | 10 | 1320/6 | 1200/1 | 4.0 | 250 | 100 | 3150 | 0.6 | 15 |
| Example 74 | 30 | 10 | 1320/6 | 1200/1 | 4.1 | 170 | 70 | 3070 | 7.8 | 17 |
| Example 75 | 40 | 10 | 1320/6 | 1200/1 | 4.2 | 140 | 50 | 3030 | 13.0 | 18 |
| Comparative Example 10 | 0 | 0 | 1320/6 | 1200/1 | 3.8 | 120 | 40 | 3040 | 0 | 2 |

EXAMPLES 76-80

The same procedure was repeated as in Example 66, except that the temperature used for heat treatment of the mass was varied as shown in Table 13. The physical properties of the ferrite core so obtained are also shown in Table 13.

TABLE 13

| | Amount of glass (wt %) | Amount of ZnO in glass (wt %) | Firing temperature and time for preparing magnetic ferrite powder (°C./hours) | Temperature and time for heat treatment (°C./hours) | Density (g/cm$^3$) | Initial magnetic permeability at 1 MHz | Dielectric loss ($Q_{max}$) | Saturation magnetic flux density at 10 Oe | Shrinkage (%) | Tensile strength (kg/m$^2$) |
|---|---|---|---|---|---|---|---|---|---|---|
| Example 76 | 5 | 10 | 1320/6 | 1300/1 | 3.9 | 450 | 20 | 3190 | 3.0 | 10 |
| Example 77 | 5 | 10 | 1320/6 | 1000/1 | 3.9 | 110 | 60 | 3010 | 0 | 8 |
| Example 78 | 5 | 10 | 1320/6 | 800/1 | 3.9 | 60 | 40 | 2970 | 0 | 7 |
| Example 79 | 5 | 10 | 1320/6 | 600/1 | 3.9 | 30 | 40 | 2850 | 0 | 5 |
| Example 80 | 5 | 10 | 1320/6 | 450/1 | 3.9 | 25 | 40 | 2800 | 0 | 4 |

EXAMPLES 81-89

The same procedure was repeated as in Example 66, except that a mixed powder composed of ferric oxide powder, nickel oxide powder, zinc oxide powder and cupric oxide powder mixed in a molar ratio of 48:13:34:5 was used, and the glass powder was added in an amount shown in Table 14. The properties of the ferrite core so obtained are shown in Table 14, along with the corresponding results for the Comparative Example 11 described below. The dielectric loss was expressed in terms of the maximum value $Q_{max}$, where Q denotes the reciprocal of the dielectric loss tan δ.

COMPARATIVE EXAMPLE 11

The same procedure was repeated as in Example 81, except that glass powder was not added.

TABLE 14

| | Amount of glass (wt %) | Amount of ZnO in glass (wt %) | Firing temperature and time for preparing magnetic ferrite powder (°C./hours) | Temperature and time for heat treatment (°C./hours) | Density (g/cm³) | Initial magnetic permeability at 1 MHz | Dielectric loss ($O_{max}$) | Saturation magnetic flux density at 10 Oe | Shrinkage (%) | Tensile strength (kg/m²) |
|---|---|---|---|---|---|---|---|---|---|---|
| Example 81 | 0.1 | 10 | 1320/6 | 1200/1 | 3.9 | 230 | 40 | 2540 | 0 | 4 |
| Example 82 | 0.3 | 10 | 1320/6 | 1200/1 | 3.9 | 240 | 70 | 2560 | 0 | 9 |
| Example 83 | 0.5 | 10 | 1320/6 | 1200/1 | 3.9 | 250 | 110 | 2570 | 0 | 11 |
| Example 84 | 1 | 10 | 1320/6 | 1200/1 | 4.0 | 320 | 100 | 2600 | 0 | 11 |
| Example 85 | 3 | 10 | 1320/6 | 1200/1 | 4.0 | 260 | 100 | 2580 | 0 | 12 |
| Example 86 | 5 | 10 | 1320/6 | 1200/1 | 4.0 | 250 | 90 | 2520 | 0.1 | 12 |
| Example 87 | 10 | 10 | 1320/6 | 1200/1 | 4.1 | 210 | 80 | 2510 | 0.7 | 15 |
| Example 88 | 30 | 10 | 1320/6 | 1200/1 | 4.2 | 200 | 70 | 2500 | 2.0 | 17 |
| Example 89 | 40 | 10 | 1320/6 | 1200/1 | 4.2 | 150 | 40 | 2480 | 5.5 | 18 |
| Comparative Example 11 | 0 | 0 | 1320/6 | 1200/1 | 3.8 | 190 | 40 | 2500 | 0 | 3 |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for the preparation of a composite ferrite material, comprising:

mixing a sintered magnetic ferrite powder with high crystallinity, and a glass powder with a softening temperature lower than the sintering temperature of said ferrite powder, subjecting said mixture to press forming, and subjecting said press-formed mass to heat treatment at a temperature which is higher than or equal to the softening temperature of said glass powder and lower than said sintering temperature to fuse said glass powder contained in said mass thereby binding said magnetic ferrite powder with said fused glass.

2. A method according to claim 1, wherein said magnetic ferrite powder is composed of granules with at least two different size distributions.

3. A method according to claim 1, wherein said sintering temperature is in the range of 1000°-1400° C.

4. A method according to claim 1, wherein said softening temperature of said glass powder is 650° C. or lower.

5. A method according to claim 1, wherein the temperature of said heat treatment is 800° C. or higher.

6. A method according to claim 1, wherein said glass contains zinc oxide.

7. A method according to claim 1, wherein said glass powder is used in an amount of 0.3 to 30% by weight based on the total weight of said glass powder and said magnetic ferrite powder with high crystallinity.

8. A method for the preparation of a composite ferrite material, comprising:

mixing a sintered magnetic ferrite powder with high crystallinity, and a glass powder with a softening temperature lower than the sintering temperature of said ferrite powder, subjecting said mixture to press forming, and simultaneous heat treatment at a temperature which is higher than or equal to the softening temperature of said glass powder and lower than said sintering temperature and thereby fusing said glass powder thus effecting the binding of said magnetic ferrite powder by said fused glass, and firing the obtained mass after said heat treatment at a temperature which is lower than or equal to the sintering temperature of said magnetic ferrite powder.

9. A method according to claim 8, wherein said magnetic ferrite powder is composed of granules with at least two different size distributions.

10. A method according to claim 8, wherein said firing temperature is in the range of 1000°-1400° C.

11. A method according to claim 8, wherein said softening temperature of said glass powder is 650° C. or lower.

12. A method according to claim 8, wherein the temperature of said heat treatment is 800° C. or higher.

13. A method according to claim 8, wherein said glass contains zinc oxide.

14. A method according to claim 8, wherein said glass powder is used in an amount of 0.3 to 30% by weight based on the total weight of said glass powder and said magnetic ferrite powder with high crystallinity.

* * * * *